United States Patent
Cunnane et al.

(10) Patent No.: US 7,953,754 B2
(45) Date of Patent: May 31, 2011

(54) METHOD AND SYSTEM FOR FINDING THE FOCUS OF A DOCUMENT

(75) Inventors: Kevin Cunnane, Whitehall (IE); Emma Curran, Drogheda (IE); Jan Macek, Blackrock (IE); Daniel McCloskey, Santry (IE); Brendan Moorehead, Loughrea (IE); Ross Shannon, Blackrock (IE); Alexander Troussov, Donabate (IE)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 11/696,279

(22) Filed: Apr. 4, 2007

(65) Prior Publication Data

US 2008/0005094 A1    Jan. 3, 2008

(30) Foreign Application Priority Data

Jul. 1, 2006   (GB) ................................. 0613197.3

(51) Int. Cl.
G06F 17/30 (2006.01)
G06F 7/00 (2006.01)

(52) U.S. Cl. ........................ 707/786; 715/206
(58) Field of Classification Search ........... 707/2
See application file for complete search history.

(56) References Cited

U.S. PATENT DOCUMENTS

| | | | | |
|---|---|---|---|---|
| 5,483,650 A * | 1/1996 | Pedersen et al. | ........ | 707/2 |
| 5,999,927 A * | 12/1999 | Tukey et al. | ........ | 707/5 |
| 6,393,427 B1 * | 5/2002 | Vu et al. | ........ | 707/101 |
| 6,460,036 B1 * | 10/2002 | Herz | ........ | 707/10 |
| 6,678,692 B1 * | 1/2004 | Hyatt | ........ | 707/102 |
| 6,738,780 B2 * | 5/2004 | Bollacker et al. | ........ | 707/101 |
| 6,778,979 B2 * | 8/2004 | Grefenstette et al. | ........ | 707/3 |
| 6,820,075 B2 * | 11/2004 | Shanahan et al. | ........ | 707/3 |
| 7,133,862 B2 * | 11/2006 | Hubert et al. | ........ | 707/3 |
| 7,275,061 B1 * | 9/2007 | Kon et al. | ........ | 707/102 |
| 2005/0149494 A1 * | 7/2005 | Lindh et al. | ........ | 707/3 |
| 2005/0154690 A1 * | 7/2005 | Nitta et al. | ........ | 706/46 |
| 2006/0259853 A1 * | 11/2006 | Zellweger et al. | ........ | 715/500.1 |

FOREIGN PATENT DOCUMENTS

JP    2005196425 A   *   7/2005

* cited by examiner

Primary Examiner — Sathyanarayan Pannala
(74) Attorney, Agent, or Firm — David A. Dagg

(57) ABSTRACT

A method and apparatus for identifying the focus of a document, in a natural language processing application, the natural language processing application comprising a hierarchical concept tree having a plurality of nodes, each node being associated with a term, the method comprising the steps of: mapping an input document to nodes in a concept tree to determine a number of occurrences of a term in the input document which also occur at a node in the concept tree; weighting each node in the concept tree, depending on the determined number of occurrences of the term in the input document and a determined value assigned to each node in the concept tree; traversing the concept tree to identify a heaviest weighted path, in dependence on the weighting of each node in the concept tree; and determining the focus of the input document by identifying a node having the heaviest weight along the most heavily-weighted path.

15 Claims, 9 Drawing Sheets

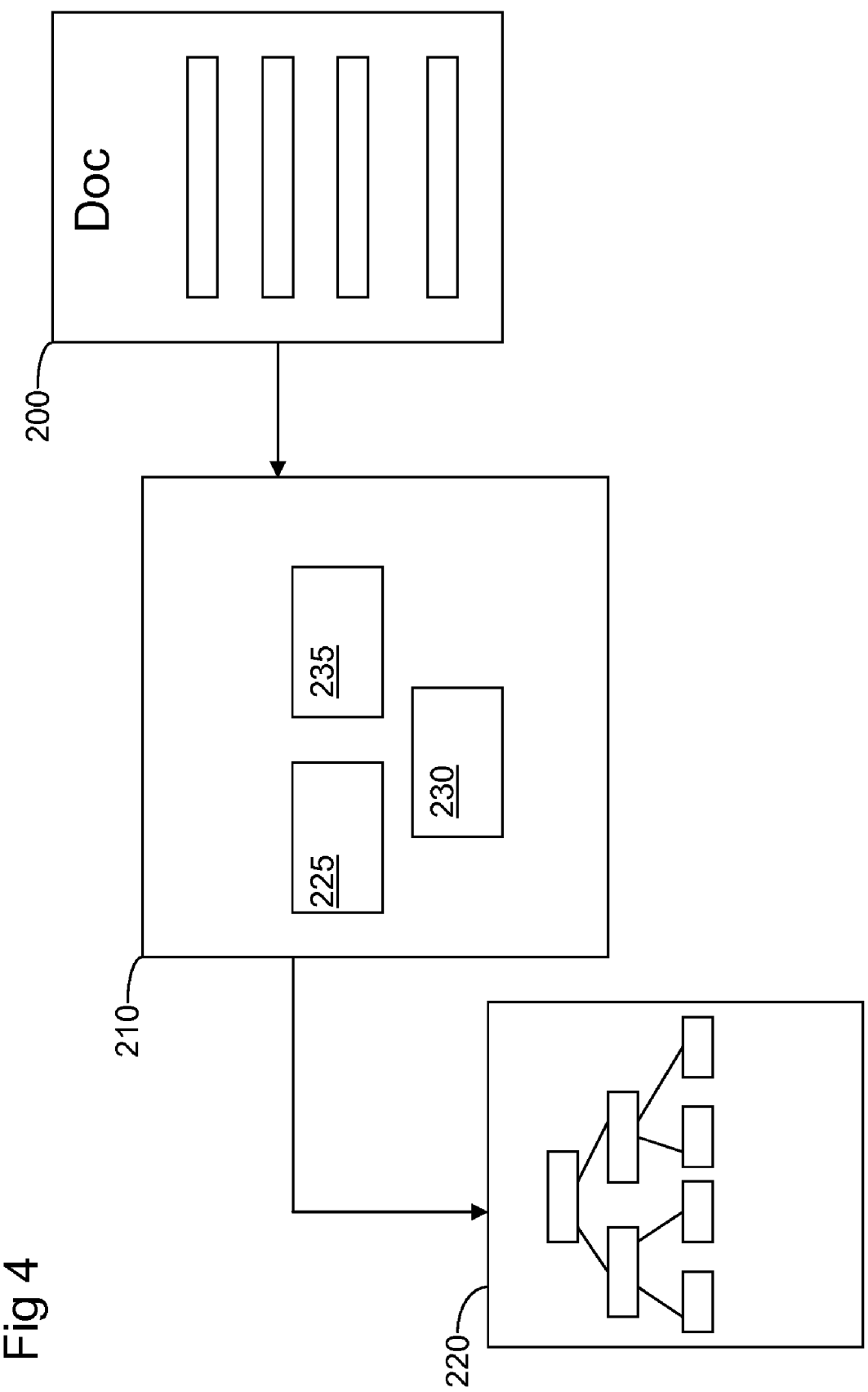

Fig 5

A man went to <u>Dublin</u> in <u>Ireland</u> to see a man about a dog. The dog was born in <u>Dublin</u> in the <u>USA</u>. However, when the dog was nine months old it was shipped to <u>Galway</u>.

<u>Galway is in Ireland</u>. <u>Ireland is in Europe</u>. <u>Dublin</u> has a population of 1, 222, 821. <u>Galway has a population of 180,364</u>. More than the population of <u>Dublin, California, USA</u>. <u>Ireland is well known for a drink called Guinness</u>.

200

METHOD AND SYSTEM FOR FINDING THE FOCUS OF A DOCUMENT

CROSS REFERENCE TO RELATED APPLICATIONS

The present application claims priority under 35 USC 119 to United Kingdom Application Number GB0613197.3, filed Jul. 1, 2006.

FIELD OF THE INVENTION

This invention relates to the field of natural language systems. In particular, the invention relates to an improved method and system for finding the focus of a document.

BACKGROUND OF THE INVENTION

Identifying the focus of a text document such as a Web page, a news article, an email, etc. is beneficial in many situations. One such situation is in data mining systems in which information is searched for throughout a large number of documents. A means of determining a focus of a document automatically, to enable a search by document topic for example, would be extremely useful.

Using knowledge organized in hierarchical structures is useful for text analysis. In computer applications this knowledge is often modeled by graphs—networks of interconnected concepts. For example, geographical locations lend themselves to be easily organized into a hierarchical tree—a "concept tree"—where each city has a parent country, which has a parent continent, and so on, all the way up to a common root element. Similarly, employees in an organization can be arranged into a hierarchical management structure, where managers themselves have managers and a list of subordinates.

The example of geographic focus is used throughout this document to illustrate a type of clearly-defined focus which can be expressed in hierarchical form. However, this should not be construed as limiting the scope of this disclosure and is merely used as an example of a type of focus. The types of focus are wide-ranging and include any topic which can be expressed in a hierarchy; for example an employee's reporting structure. To accomplish the goal of determining the focus of a document, an understanding of the topics in a document is needed. This is usually inferred from an analysis of the words used in the document, performed by some form of Natural Language Processing. However, words are ambiguous and the same word or term might refer to different concepts. In the case of geographic topics, confusion can arise if there exists several places in the world with the same name, or where a place name is also a common word or an individual's name, etc. For example, when finding the geographic focus of a document, if we take the term 'Dublin'; it is known that there are multiple locations in the world with the name 'Dublin' and thus the term 'Dublin' may be confusing and the ambiguity caused by this needs to be resolved—i.e. the term needs to be disambiguated.

To do this, a data mining algorithm parses a document and maps each term in the document to a pre-existing concept tree in order to find the focus of the document. A graph clustering algorithm establishes the central concept of the document i.e. that a central concept or focus of the document is of a geographical nature. Next any ambiguous terms i.e. where there are occurrences of the terms like 'Dublin', or 'Galway', must be resolved—i.e. are the terms 'Dublin' and 'Galway' referring to the cities in Ireland or those in the U.S.A? The step of resolving ambiguous terms based on the metric of their theoretical similarity to the document's focus is called term disambiguation.

There are a number of known prior art methods for finding the focus of a document and for providing term disambiguation. However, normally different methods are suggested for the tasks of finding the focus of a document and term disambiguation—please refer to Wu and Palmer, 1994 "(Verb semantics and lexical selection", 32*nd Annual meeting of the Association for Computational Linguistics*, Las Cruces, N. Mex., 1994, pp. 305-332) and Leacock and Chodorow 1998 "(Combining local context and WordNet similarity for word sense identification", In C. Fellbaum (Ed.), *Wordnet: An electronic lexical database*, MIT Press 1998, pp. 265-283).

The time complexity of these suggested algorithms limits their utility because of the increased time it takes to find the focus of a document and then perform term disambiguation. This increased time complexity prohibits use of these algorithms in important industrial applications, where the number of nodes on the concept tree may be large and thus the calculation of the central concepts of even a single document may become infeasible within a reasonable time.

Thus there is a need in the art to provide an algorithm that can find the central concept of a document and term disambiguation in a time-efficient manner without the complexities of the prior art.

SUMMARY OF THE INVENTION

Viewed from a first aspect, the present invention provides a method for identifying the focus of a document, in a natural language processing application, the natural language processing application comprising a hierarchical concept tree having a plurality of nodes, each node being associated with a term, the method comprising the steps of: mapping an input document to nodes in a concept tree to determine a number of occurrences of a term in the input document which also occur at a node in the concept tree; weighting each node in the concept tree, depending on the determined number of occurrences of the term in the input document and a determined value assigned to each node in the concept tree; traversing the concept tree to identify a heaviest weighted path, in dependence on the weighting of each node in the concept tree; and determining the focus of the input document by identifying a node having the most heaviest weight along the most heavily-weighted path.

Preferably, the present invention provides a method wherein the determining step further comprises determining if the determined focus is too specific for the input document and on a positive determination identifying a specific focus of the input document by identifying a node having a value which is less than the sum of the node's child nodes.

Preferably, the present invention provides a method wherein the step of weighting further comprises incrementing a weight count at each node, each time a term in the input document is mapped to a node in the concept tree.

Preferably, the present invention provides a method wherein the step of weighting further comprises identifying an ambiguous term in the input document, by mapping the term in the input document to a plurality of nodes in the concept tree.

Preferably, the present invention provides a method wherein, the step of traversing the concept tree further comprises performing a depth first search to identify the node along a weighted path having the heaviest weight.

Preferably, the present invention provides a method wherein on traversing the concept tree to identify the focus, and computing more than one focus, the traversing step further comprising the step of, determining whether the determined weights of each of the focus nodes differ by a threshold value and on a positive determination, traversing each of the focus node's paths until another focus node is identified.

Preferably, the present invention provides a method wherein if the traversing step traverses the concept tree and identifies the focus being a node having only a weight of the sum of its child node, the traversing step continues to traverse the remainder of the node's path to find an alternative focus.

Viewed from a second aspect, the present invention provides an apparatus for identifying the focus of a document, in a natural language processing application, the natural language processing application comprising a hierarchical concept tree having a plurality of nodes, each node being associated with a term, the apparatus comprising: a scanning component for mapping an input document to nodded in a concept tree to determine a number of occurrences of a term in the input document which also occur at each of the nodes in the concept tree; a determining component for weighting each node in the concept tree, on dependence of the determined number of occurrences of the term in the input document and a determined value assigned to each node in the concept tree; a determining component for traversing the concept tree to identify a heaviest weighted path, in dependence of the weighting of each node in the concept tree; and a determiner component for determining the focus of the input document by identifying a node having the heaviest weight along the heaviest weighted path.

Viewed from a third aspect the present invention provides a computer program product loadable into the internal memory of a digital computer, comprising software code portions for performing, when said product is run on a computer, to carry out the invention as described above.

Viewed from a fourth aspect the present invention provides a data processing system for, identifying the focus of a document, the data processing system comprising, a central processing unit, a memory device and a storage device adapted for carrying out the invention as described above.

Advantageously, the present invention provides a high performance focus determining algorithm. Experiments with huge taxonomies (such as a tree of every IBM employee) and wide ambiguity of terms (like people's first names), have shown that the algorithm can perform disambiguation in less than 100 milliseconds.

The high speed of the focus determining algorithm means that new applications are now possible. Consider the following example: a person is reading an email which mentions three fellow employees by their first name only. The focus determining algorithm can be used to disambiguate these terms very quickly and then use external domain knowledge to, for example, add a link into the document that allows the user to send an email to that person directly. In a large organization with thousands or even just hundreds of employees, an algorithm that runs in quadratic time would be far too slow for this to be feasible. The focus determining algorithm runs quickly enough for this to work. It can even be used effectively to disambiguate terms used in an instant messaging conversation in real time. Real time communications such as this require a response time within 200 ms, so this algorithm is perfectly suited to such applications.

BRIEF DESCRIPTION OF THE DRAWINGS

Embodiments of the present invention will now be described, by way of examples only, with reference to the accompanying drawings in which:

FIG. 4 is a more detailed block diagram of the system of FIG. 2 in accordance with a preferred embodiment of the present invention;

FIG. 5 is an example of an input document as is known in the art;

DETAILED DESCRIPTION OF EXEMPLARY EMBODIMENTS

Figure 1:
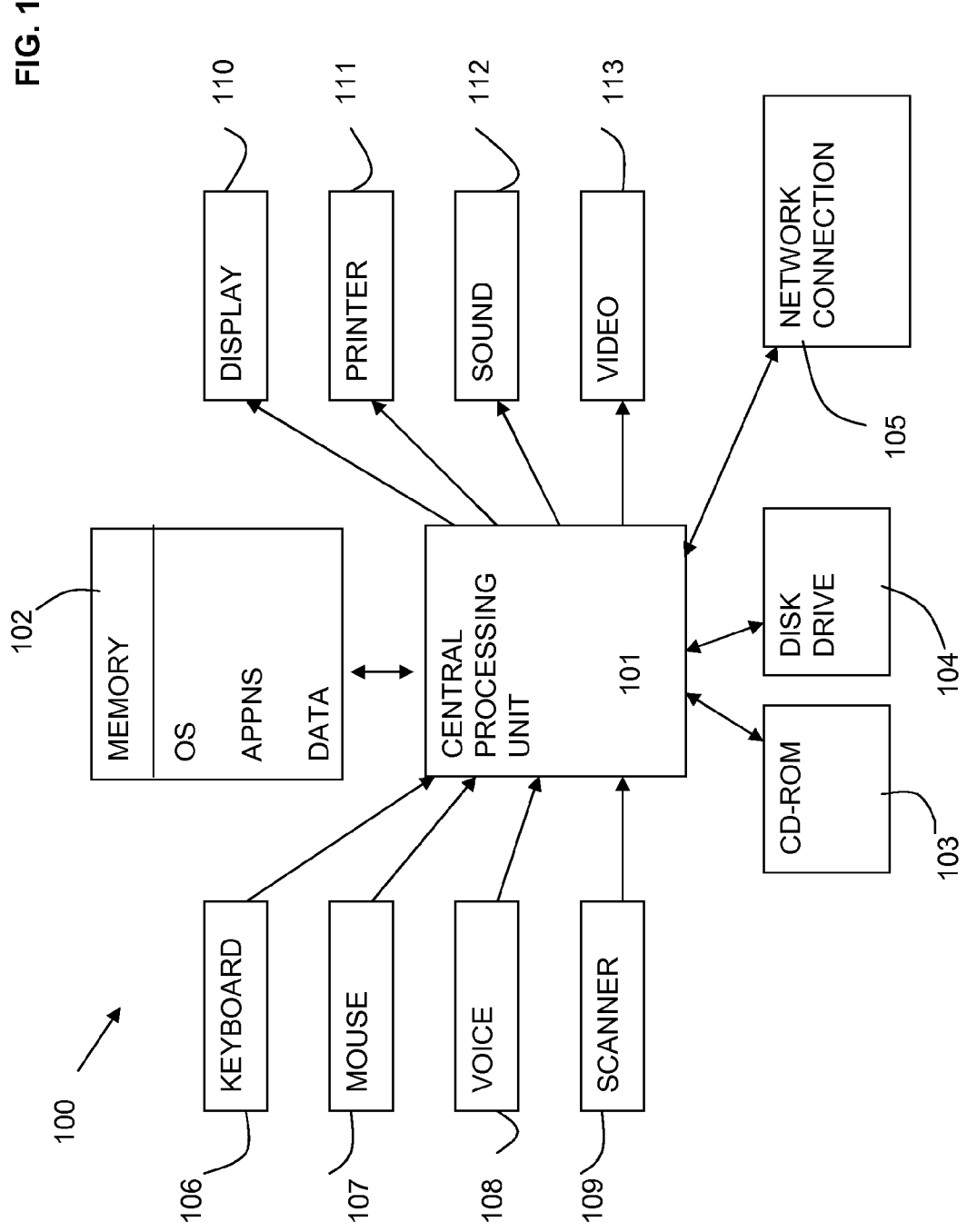
FIG. 1 is a block diagram of a general purpose computer system in which a system in accordance with the present application may be implemented.

Referring to FIG. 1, a general embodiment of a computer system 100 is shown in which the present invention may be implemented. A computer system 100 has a central processing unit 101 with primary storage in the form of memory 102 (RAM and ROM). The memory 102 stores program information and data acted on or created by the programs. The program information includes the operating system code for the computer system 100 and application code for applications running on the computer system 100. Secondary storage includes optical disk storage 103 and magnetic disk storage 104. Data and program information can also be stored and accessed from the secondary storage.

The computer system 100 includes a network connection means 105 for interfacing the computer system 100 to a network such as a local area network (LAN) or the Internet. The computer system 100 may also have other external source communication means such as a fax modem or telephone connection.

The central processing unit 101 includes inputs in the form of, as examples, a keyboard 106, a mouse 107, voice input 108, and a scanner 109 for inputting text, images, graphics or the like. Outputs from the central processing unit 101 may include a display means 110, a printer 111, sound output 112, video output 113, etc.

In a distributed system, a computer system 100 as shown in FIG. 1 may be connected via a network connection 105 to a server on which applications may be run remotely from the central processing unit 101 which is then referred to as a client system.

Figure 2:
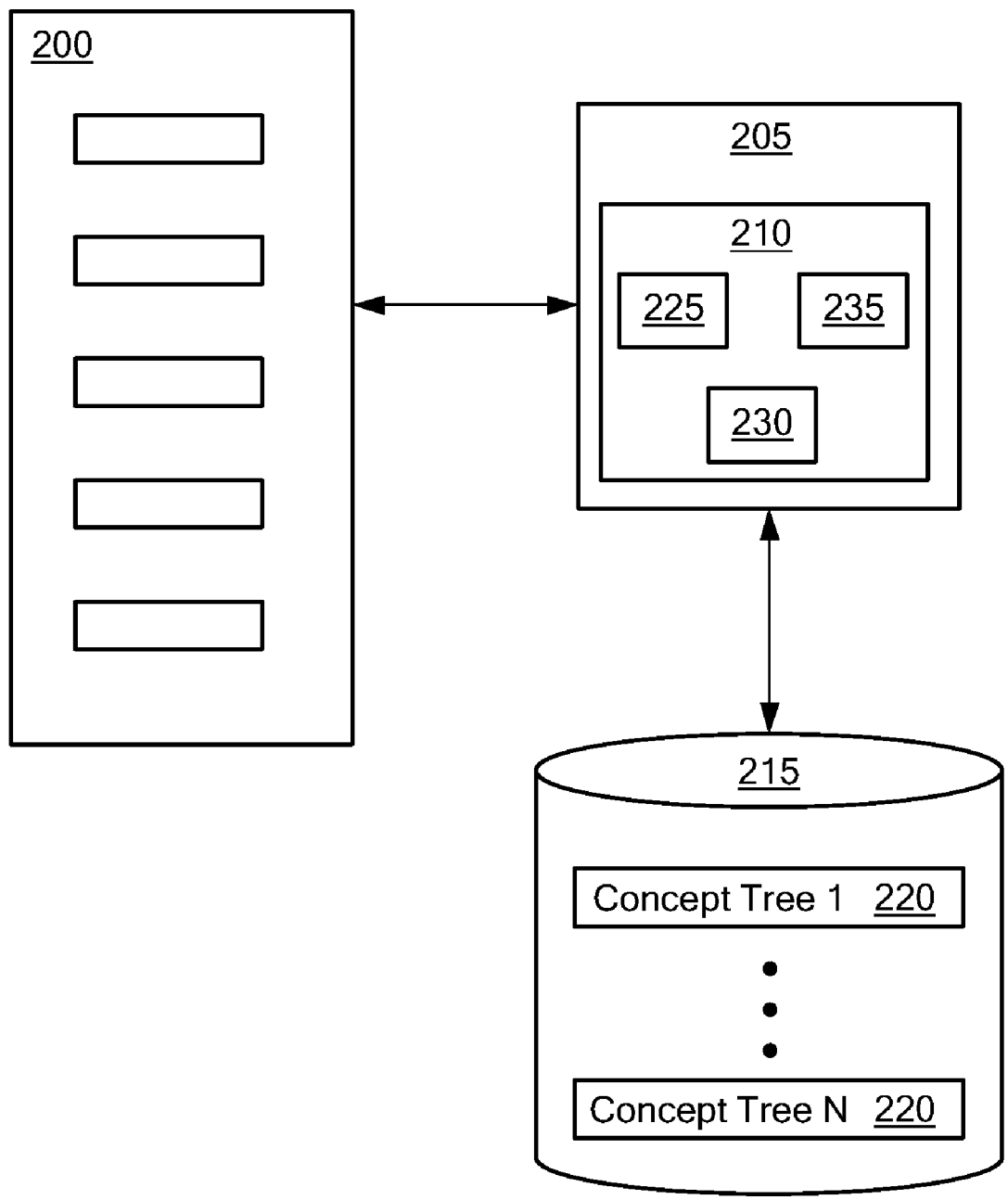
FIG. 2 is a schematic block diagram of a system in accordance with a preferred embodiment of the present invention.

A focus determining component is provided in accordance with a preferred embodiment of the present invention which determines the focus and performs term disambiguation of a text document. Referring to FIG. 2, a focus determining component 210 is shown interfacing with a text mining application 205 and a data store 215. The data store stores a number of concept trees 220. The focus determining component 210 may work on any text document such as a word processed document, a scanned document, an email message, a Web page, or a published article, etc.

The focus determining component 210 may be provided as part of a data or text mining application or as part or a natural language processing application, a search engine of an Internet access program, or as part of another form of text indexing and retrieving program. The focus determining component 210 may run on a computer system 100 or from storage means in a computer system 100 and may form part of the hardware of a computer system 100 or may be run remotely via a network connection 105.

The focus determining component 210 comprises a number of components, namely, a scanning component 225, a retrieval component 235 and a determiner component 230, which interface and interact with each other in order to determine the focus and the disambiguation of terms in a document 200. Each of these components will be explained in turn.

The scanning component 225 scans an input document 200 to identify instances of term references in the form of words or phrases. For each instance located, this occurrence is recorded in a concept tree 220. A concept tree 200 is a hierarchical data structure comprising nodes, in the form of a root node 300 and a number of internal or leaf nodes 305, 310—the totality of the nodes comprising a hierarchical taxonomy.

There may be a number of concept trees 220, each concept tree 220 comprising a different type of taxonomy, for example geography or management structure etc. The concept trees 220 are stored in the data store 215 and retrieved from the data store 215 by the retrieval component 230 on request of the scanning component 225.

Figure 3A:
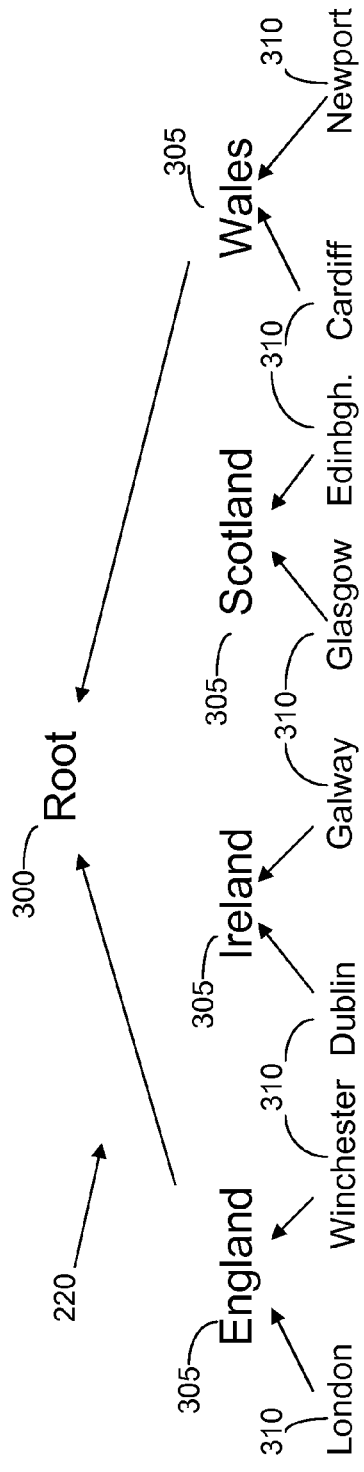
FIGS. 3a and 3b are tree diagrams illustrating two types of hierarchical tree structures—a geographical taxonomy and a file system hierarchy.
Figure 3B:
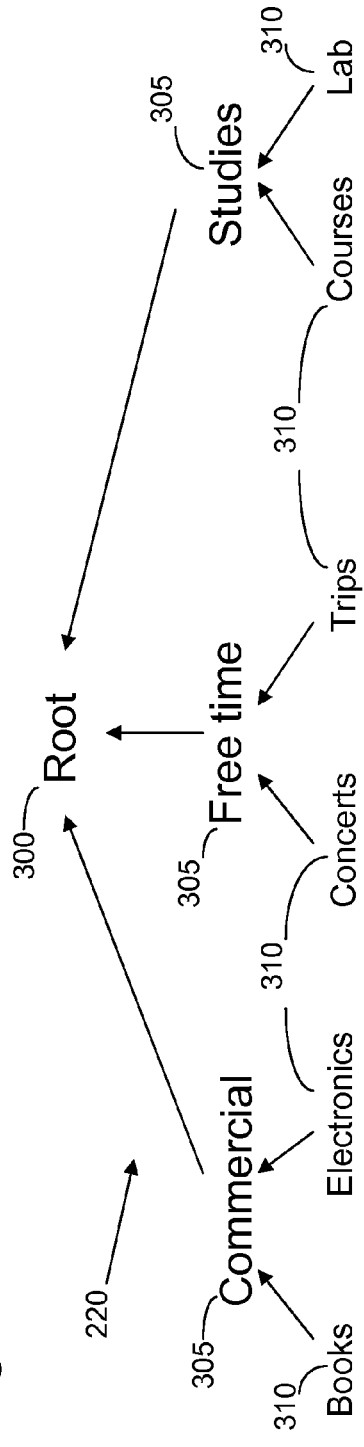

Two types of hierarchical taxonomies are shown in FIGS. 3a and 3b. As previously explained a concept tree 220 comprises a root 300 i.e. the high level classifier—geography in FIG. 3a and email folders in FIG. 3b. From the root a number of branches are provided in which nodes exist 305. Each branch comprises a level, for example, countries in FIG. 3a and high level activities in FIG. 3b. Each branch results in an internal node, for example England, Ireland, Scotland and Wales in FIG. 3a and Commercial, Free time and studies in FIG. 3b. From each level of nodes 305, a further level of branches may exist, each branch having further child nodes 310, and each increasing in specificity. For example, in FIG. 3a, there are further branches i.e. cities and post codes etc each level having further nodes. The same idea is shown in FIG. 3b wherein from the level of high level activities branch into levels of categories of the high level activities and so on. Each concept tree 220 may have many hundreds if not thousands of nodes 305, 310.

On the scanning component's 225 first pass of the document 200 it records each occurrence of a term in the document 200 that also appears in the concept tree 220. For example, using the example of FIG. 3a the scanning component 225 scans the document 200 and parses the term 'England'; if the term 'England' also appears in the geographical concept tree 220, the scanning component 225 increments a counter on each node 305 that represents the term 'England' in the concept tree.

Once the scanning component 225 has completed this process for every term in the document 200, the determiner component 230 determines weights to be added to each occurrence of each term in the concept tree 220—this is the first step of term disambiguation.

For example, if the term 'Dublin' appeared in the concept tree 220 five times—each of these nodes would have a one in five probability of being the 'correct' Dublin. Hence the determiner component 230 assigns a weighting of ⅕ to each occurrence of the term 'Dublin' in the concept tree 220, as they are ambiguous nodes. However, if an instance of a term only appeared once in the concept tree 220, the node representing the instance of the term is assigned a weighting of one and would be classed as an unambiguous node with a weighting of one.

Each mention of a term in the document 200 raises those nodes' weights by this same amount, so that if 'Dublin' was mentioned twice in the document 200, each node that represented the concept of 'Dublin' will have a weight of ⅖. This additional weighting means that geographic locations (or employees etc.) that are mentioned more often will have greater bearing on the document's eventual computed focus.

Each of these weights propagates up the concept tree 220 towards the root 300, so that a parent node 305 with two children nodes 310 each having a weight of one third will itself have a weight of two thirds and so on. This means that each node is weighted as the weight of the sub-tree rooted in the node.

The operational steps of the focus determining component 210 can be formulized into an algorithm. The focus determining algorithm 210 is based on the generation and use of two real-valued integer functions of nodes of the concept tree 220.

W(node): A real integer value representing the node's weight, or specification force, which takes into account the number of mentions in text and ambiguity of the concept for this node; and U(node): A generalization force, which takes into account the structure of the concept tree. Use of this function prevents the computed focus from becoming too specific.

Firstly, in order to understand the focus determining algorithm 210 an explanation of each of the notations used with in the focus determining algorithm 210 are explained in the table below.

| Notations | |
|---|---|
| Taxonomy | A taxonomy is a hierarchical system that represents different levels of more generalized or more specific information. |
| Concept tree | Taxonomies typically produce a 'tree-shaped' hierarchy which allow users to start at the general and then bore down to the level of specific detail that suits them. For computational purposes taxonomies are modeled as graphs, for many important taxonomies these graph are trees. |
| Subtree | Given a tree and a node 'a' in the tree, the set of all nodes which have 'a' as ancestor represents a tree structure; this is called the subtree rooted in a. |
| T | Tree |
| A, b, c, d | Nodes |
| F | A node. We use this variable in the algorithm for finding the "focus" concept (node) |
| N, i, j | Integer indexes |
| level(a) | Nodes in the tree can be arranged in levels. The root is the only node at level 0. Level 1 contains all the children of the root node. Level 2 contains all the children of the nodes at level 1, and so on. |

-continued

| Notations | |
|---|---|
| height | The height of a tree is the number of different levels that are present in the tree. |
| P(a) | Parent node of a node a |
| w(a) | "weight" of the node (reflects the mentions of the concept behind the node; frequent use increases weight, ambiguity decreases weight) |
| w_norm(a) | Normalized weight (the sum of normalized weights of all nodes equals to 1) |
| W(a) | Subtree weight - "weight" of the subtree rooted in a, (the sum of w_norm(b) for all nodes b in the subtree rooted in a) |
| U(a) | "Generalization force" - function used by algorithms. Relations between functions W(a) and U(a)are of the similar kind as relations between gravitation and anti-gravitation. Function W(a) acts like "gravitation" force which pushes focus from the root to more specific concepts, while function U(a) prevents "over-specification" by pulling focus back towards the root. |

As previously mentioned the scanning component 225 parses text in a document and maps occurrences of a term in the document 200 to a term occurring in the concept tree 220. This process of mapping one term to another can formally be described by the following formula which enables a calculation of a weighting for each occurrence of a term in the concept tree 220.

if there is unambiguous mapping from mention in text to the node a, then $w(a) += 1$ (for example, if there is only one singular mention of a term in the concept tree).

if a mention of a term in a document 200 corresponds to n ambiguous nodes in the concept tree 220, then $w(a) += 1/n$ This occurs when there is more than one instance of a term in the concept tree 220.

These weights are propagated up the concept tree 220 to all parent nodes of a. A total of the concept tree's 220 entire weight is therefore stored in the root node 300, formally:
The weight of the concept tree 220 becomes:

$w(T) = \text{SUM } w(a)$ for all nodes a in the tree T

Once the scanning component 225 finishes, the focus is computed by the following algorithm.

1a. Global normalization of weights of each node:
    w_norm(a) = w(a)/w(T)
1b. Initialization: computation of function U(a) (generalization force)-:
    U(a) = alpha (level(a)+ 1) / height + beta where alpha and beta are empirical parameters of the algorithm.

2. Placement of the focus to the root node
    f = root node of the tree
3. Branching: moving focus from parent to a child
   If f has no children - STOP
       Select a child with the biggest value W(a)
           a* = Argmax {W(a): a is a child of the node f}
       IF
           W(a*) – U(a*) > 0
       THEN
           f = a* ; GOTO 3
       ELSE
   STOP The operational steps of the focus determining algorithm can be explained as followed. Computing the focus position on the concept tree 220 is a multi-step process. To begin, the focus is placed at the root node 300 (the most general concept). Then, the focus determining algorithm 210 continuously moves the focus down the tree following the "heaviest path". More specifically, the focus determining algorithm 210 works in iterations moving the focus from a parent node 300 to its child node 305 with the biggest value of specification force W. This process allows it to find most specific concepts mentioned in the document 200.

However, finding the most specific concepts is not always the goal, some generalization is beneficial. At each step in the focus-finding process, the decision to move the focus further from the root 300, narrowing to a particular subtree of interest, is taken by comparing the "specification force" W(node) with "the generalization force" U(node) for that node.

The focus will come to rest on a node 305, 310 when all of its children's U(node) value is greater than their W(node) property. The above concepts will be explained further with reference to FIGS. 4, 5, 6 and 7—each of these figures should be read in conjunction with the others.

FIG. 4 shows the focus determining component 210 (and it sub components) along with a document 200 and a concept tree 300. The document is a text document and this is shown in greater detail in FIG. 5, the concept tree 220 is a geographical concept tree 220 and this is shown in greater detail in FIG. 6.

Figure 6:
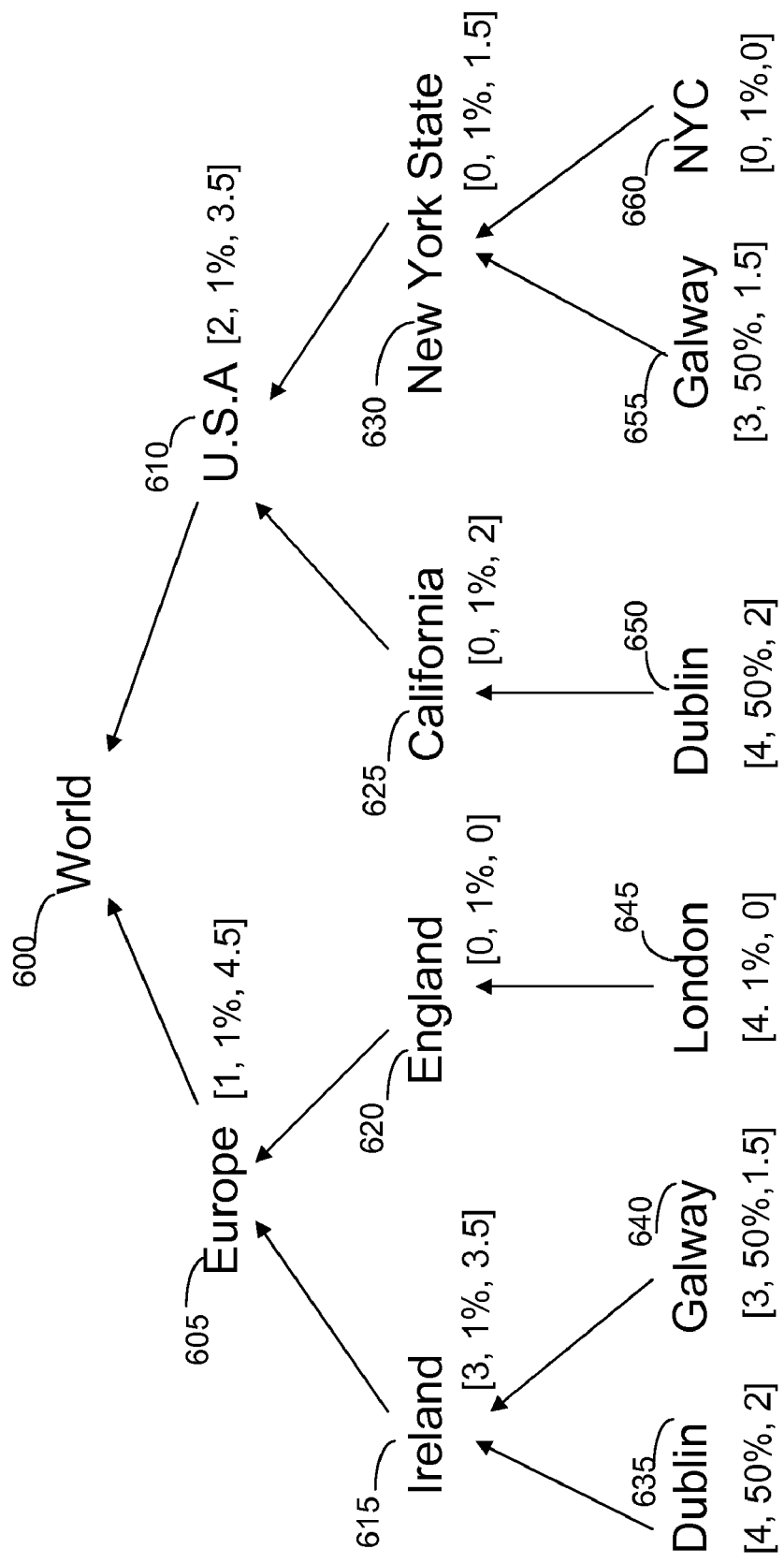
FIG. 6 is a geographical tree structure showing the operational steps of the focus determination algorithm accordance with a preferred embodiment of the present invention.
Figure 7:
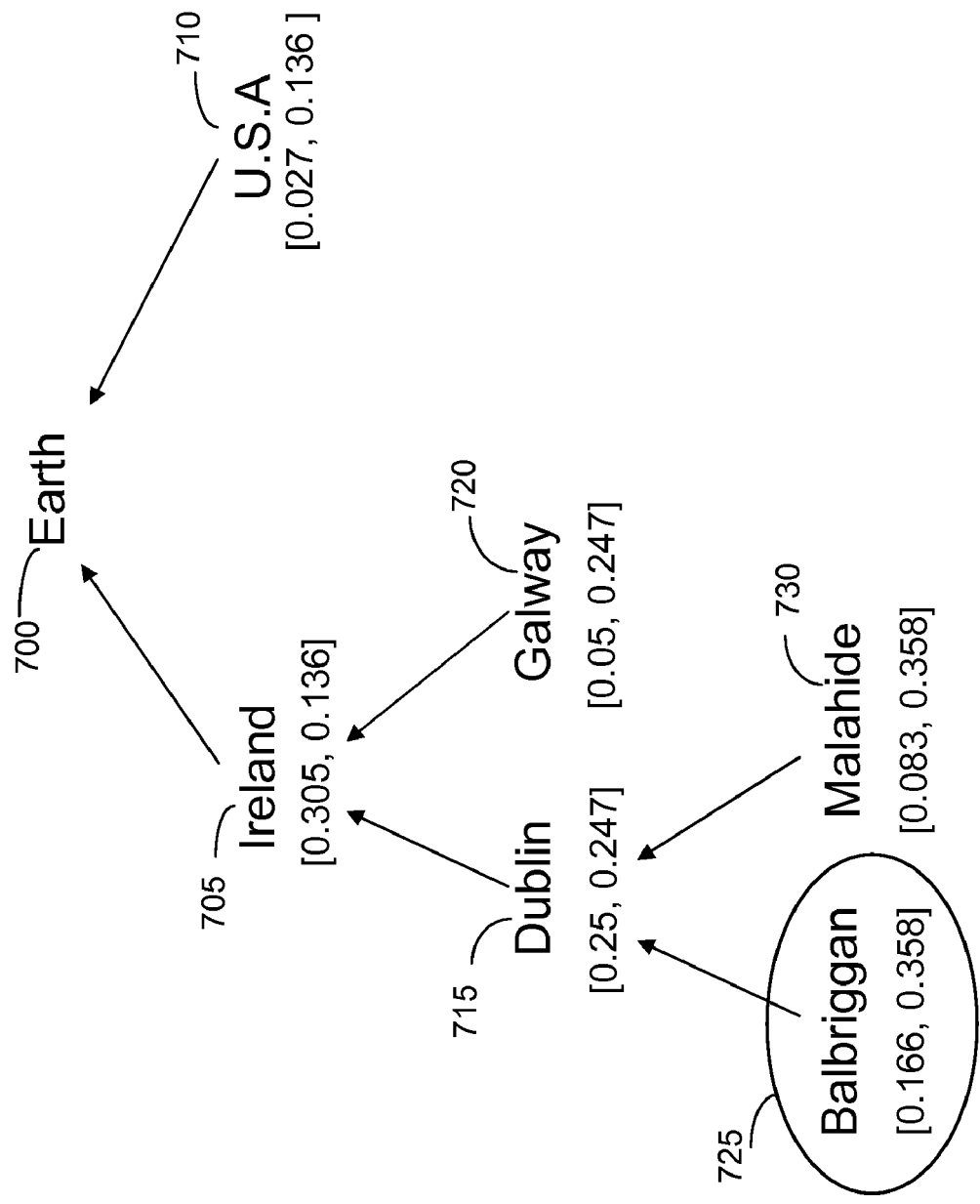
FIG. 7 is a weighted concept tree showing the output of the pseudo code of test 1.
Figure 8:
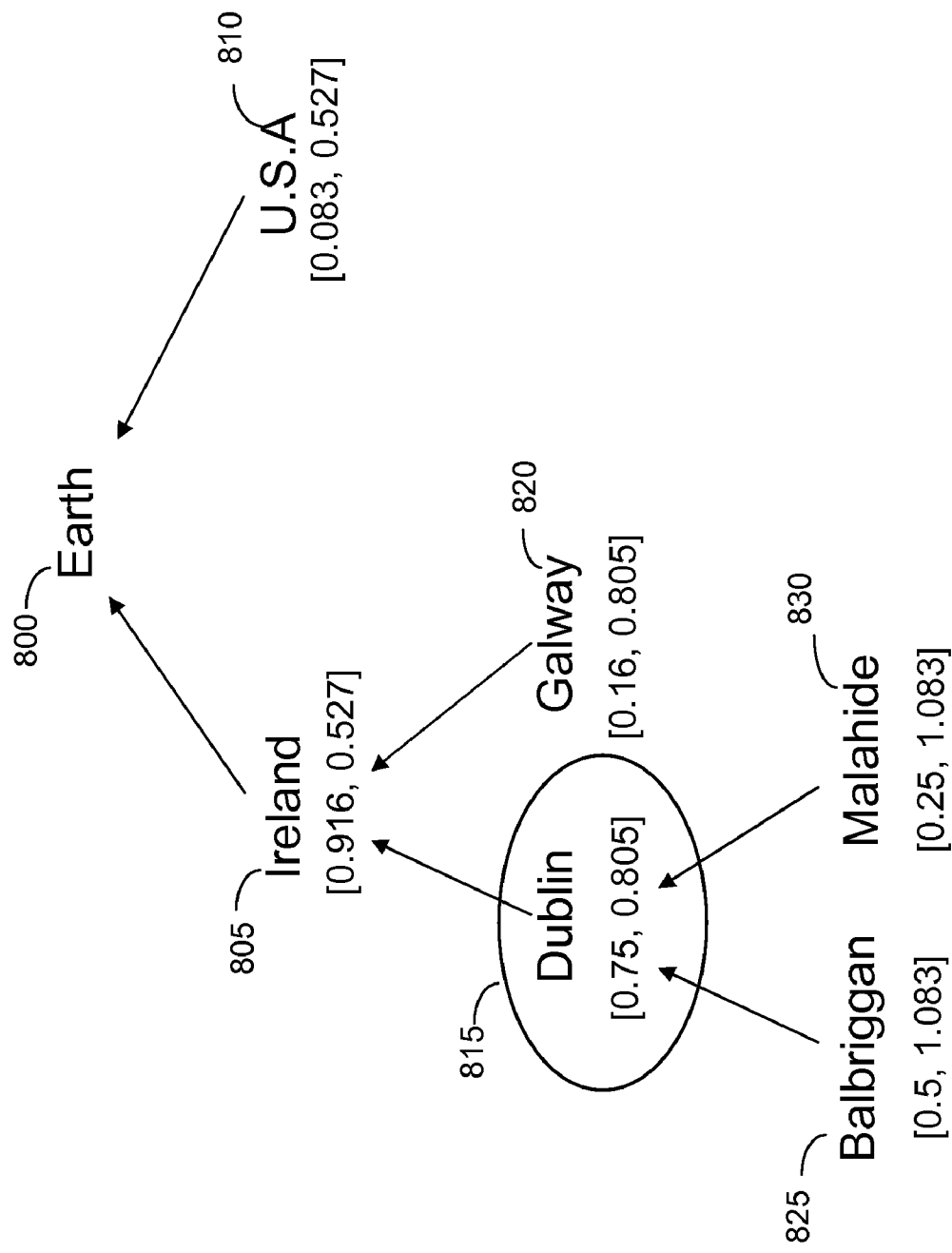
FIG. 8 is a weighted concept tree showing the output of the pseudo code of test 2.
Figure 9:
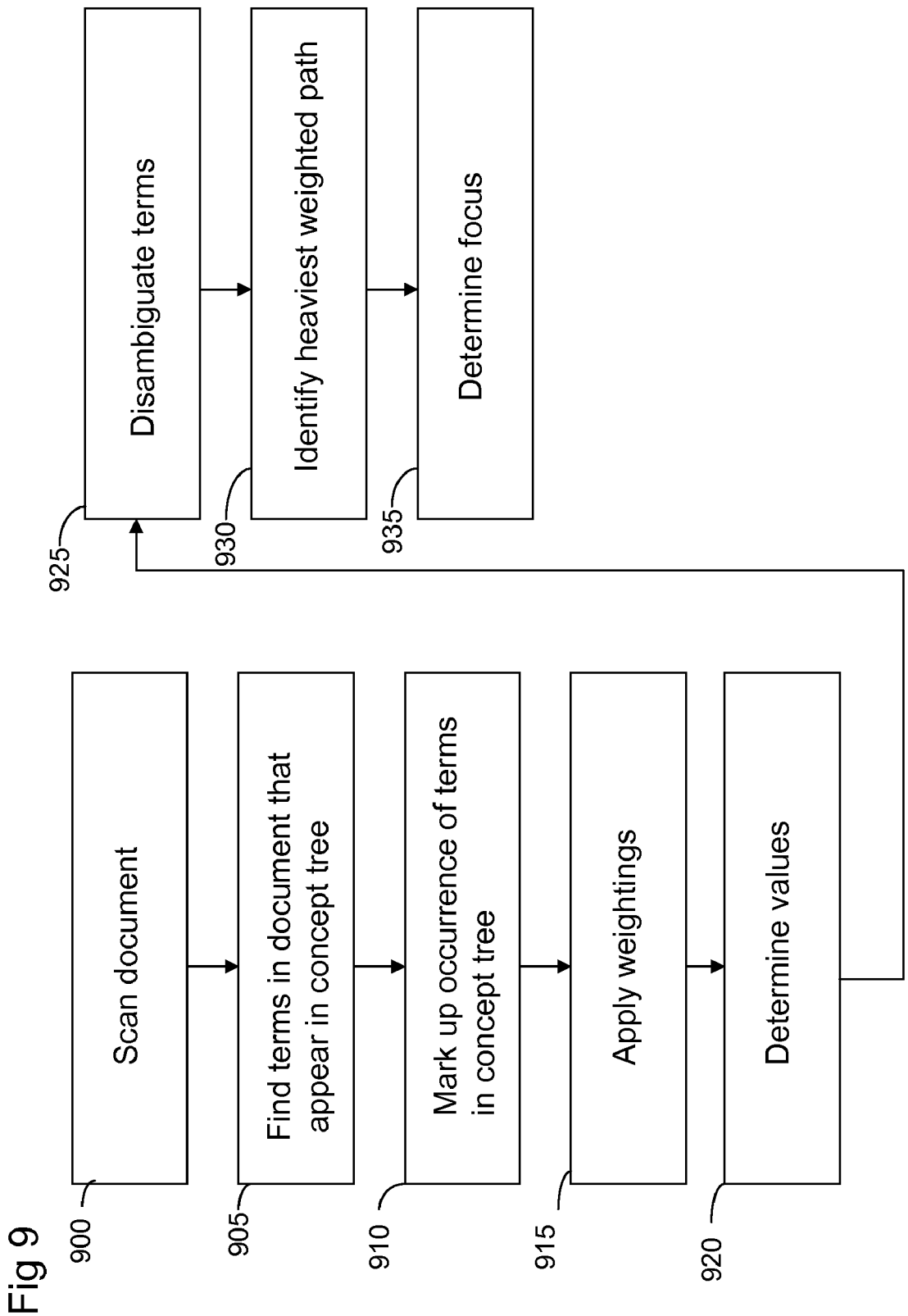
FIG. 9 is a flow chart detailing the process steps of a preferred embodiment of the present invention.

The focus determining component 210 begins by taking a text document 200 as input. The text document 200 comprises words making up two paragraphs of text as shown in FIG. 6. The scanning component 225 begins by scanning (step 900 of FIG. 9) the text document 200 and identifies the text document 200 having a geographical focus and requests the requester component 235 to retrieve a geographical concept tree (step 905). The scanning component 225 scans the document 200 for geographical terms and each time the scanning component 225 locates a geographical term it increments a counter in the concept tree 220 for each occurrence of the term. For example, taking the document 200 of FIG. 5, the scanning component 225 scans the document 200 and locates the term 'Dublin'. The scanning component 225 then performs a lookup in the concept tree 220 (FIG. 6) and determines that the term 'Dublin' appears twice and increments a counter for each node with the term 'Dublin'.

Next the scanning component 225 locates the term 'Ireland' and again performs a lookup in the concept tree 220 of FIG. 6 to locate the term 'Ireland' and increments a counter.

As shown so far the term 'Dublin' is an ambiguous term but the term 'Ireland' is unambiguous. Next, the scanning component 225 locates a second occurrence of the term 'Dublin' in the document 200 and again increments a counter for the term 'Dublin' in the concept tree 220. Both occurrences of 'Dublin' now have a count of two. Next, the scanning component 225 locates the term 'U.S.A' and again increments a counter in the concept tree 220. This process is continued until all geographical terms in the document 200 have been processed—thus deriving the final result of:

| | |
|---|---|
| Europe | 1 |
| Ireland | 3 |
| Dublin | 4 |
| Galway | 3 |
| England | 0 |
| London | 0 |
| U.S.A | 2 |
| California | 0 |
| Dublin | 4 |
| New York State | 0 |
| New York City | 0 |

Next, the determining component 230, determines from the concept tree 220, the number of times a specific term occurs in the concept tree 220. In the example, of FIG. 6, Dublin occurs twice and therefore for any instance of the term 'Dublin' found in the document 200, the term 'Dublin' has a fifty percent chance of being either Dublin of Ireland and thus the focus of the document is Ireland or Europe, or Dublin of the U.S.A and thus the focus of the document should be California or the U.S.A.

The determination component 230 therefore weights each term in the concept tree 220 as follows (step 910):

| | Occurrences in documents | Weights |
|---|---|---|
| Europe | 1 | 1 |
| Ireland | 3 | 1 |
| Dublin | 4 | 50% |
| Galway | 3 | 50% |
| England | 0 | 1 |
| London | 0 | 1 |
| U.S.A | 2 | 1 |
| California | 0 | 1 |
| Dublin | 4 | 50% |
| New York State | 0 | 1 |
| New York City | 0 | 1 |

These weights are applied to the concept tree 220 and for each occurrence of the term identified in the concept tree 220, the term instances are given a value based on the weighting and the number of occurrence as is shown in FIG. 6 and the table below.

| | Occurrences in documents | Weights | Value |
|---|---|---|---|
| Europe | 1 | 1 | 1 |
| Ireland | 3 | 1 | 3 |
| Dublin | 4 | 50% | 2 |
| Galway | 3 | 50% | 1.5 |
| England | 0 | 1 | 0 |
| London | 0 | 1 | 0 |
| U.S.A | 2 | 1 | 2 |
| California | 0 | 1 | 0 |
| Dublin | 4 | 50% | 2 |
| New York State | 0 | 1 | 0 |
| New York City | 0 | 1 | 0 |

Taking each of these values the determination component 230 then sums each of the children nodes 310 weights with their parent node's 305 weight until each parent node 305 is weighted as its own assigned value summed with each of its child node's weights. This is shown in FIG. 6—where each node 305, 310 has a value comprising the sum of its own value with that of its child node's values and thus performing term disambiguation (step 925).

For example, the root node 600 comprises child nodes Europe 605 and U.S.A 610. The Europe node 605 has a weighting of the sum of its own weighting and that of the node Ireland 615 and England 620. Likewise the node U.S.A 610 has a weight of the sum of its own weight plus the weights of the nodes California 625 and New York State 630. The Ireland node 615 has a weight of the sum of the weight of the Dublin node 635, the Galway node 640 and its own weight. The England node 620 has a sum of its own weight and that of the London node 645. The California node 625 has a weight of the sum of its own weight and the weight of the Dublin node 650 and lastly, the New York State node 630 has a sum of the weight of the Galway node 655, the weight of the NYC node 660 and its own weight.

Then, the determination component 230, starting from the root node, traverses the concept tree 220, following the heaviest path (step 930)—in the example of FIG. 6 the heaviest path is Europe 605, Ireland 615 and Dublin 635. The focus of the document 200 will come to rest on a node in the tree, where all of its children's generalization value is greater than their weights i.e. the focus will fall on the node Ireland 615 (step 935).

FURTHER EXAMPLES

The focus determining algorithm 210 is demonstrated in operation on geographical data taken from the World Gazetteer. A preferred embodiment of the present invention is shown operating on the textual terms Balbriggan 725, Malahide 730 and Galway 720 using two different operational parameters. The first operational parameter generates a more specific focus for the document 200 and the second operational parameter generates the possibility to bias the output towards more general focus of the document 200. The results of the focus determining algorithm 210 are shown in FIGS. 7a and 7b respectively for test 1 and test 2 below.
Test 1 Described Using Pseudo Code h = 3 (tree depth), alpha = 1/3, beta = 0.1/h
[(Balbriggan,2.0), (Malahide,1.0), (Galway,1.0)]
    Found Ireland 705/earth 700/ with normalized weight 0.3056
    Found U.S.A 710/earth 700/ with normalized weight 0.0277
    Choose Ireland 705 /earth 700/ with generalization force 0.136
    Go down
    Found Dublin 715 /Ireland 705/earth 700/ with normalized weight 0.25
    Found Galway 720 /Ireland 705 /earth 700/ with normalized weight 0.056
    Choose Dublin 715 /Ireland 705 /earth 700/ with generalization force 0.247
    Go down -continued

```
Found Balbriggan 725 /Dublin 715 /Ireland 705 /earth 700/ with
   normalized weight 0.167
Found Malahide 730 /Dublin 715 /Ireland 705 /earth 700/ with
   normalized weight 0.083
Choose Balbriggan 725 /Dublin 715 /Ireland 705 /earth 700/ with
   generalization force 0.3583
Stop.
```

Test 2

```
h = 3 (tree depth), alpha = 5/6, beta = 1/h
[(Balbriggan,2.0), (Malahide,1.0), (Galway,1.0)]
   Found Ireland 805/earth 810/with normalized weight 0.916
   Found U.S.A 810/earth 800/with normalized weight 0.083
   Choose Ireland 807/earth 800/with generalization force 0.527
   Go down
   Found Dublin 815/Ireland 805/earth 800/with normalized weight 0.75
   Found Galway 820/Ireland 805/earth 800/with normalized weight
   0.167
   Choose Dublin 815/Ireland 805/earth 800/with generalization force
   0.805
   Stop.
```

Possible Modifications of the Algorithm
Strengthening Unambiguous Terms

In some applications where unambiguous mentions of a term in a document 200 occur less frequently (and so are less useful for disambiguating other ambiguous entities), it may be useful to change the weighting of ambiguous concepts from 1/n to, for example, 1/(n**1.5) where n is the number of nodes 305, 310 a term refers to.

Thus, a term that corresponds to four nodes in the concept tree 220 will apply a weight of ⅛ to each of these nodes, whereas an unambiguous term will apply a weight of a full 1.0 to its corresponding node 310, allowing this node 305 to play a greater part in the eventual computation of the focus.

Documents Having Many Central Concepts

It may be the case that a document 200 or part of a document 200 may have two or more discernible foci. To account for this possibility, during step three of the algorithm (when moving the focus to the child node 305, 310 with heaviest weight), if two or more child nodes 310 have weights that differ by the value of some threshold variable from each other, the algorithm may split the foci into two and continue recursively down both subtrees until each focus element has come to rest. It can then return a list of foci elements.

Assigning of U Function

Function U might be assigned individually for each node 305, 310 of the concept tree 220. This scenario might be useful for tuning of the algorithm for taxonomies with small number of nodes. In the preferred embodiment automatic computation of the function U as a linear function depending on the distance of the node to the root normalized to the height of the conceptual tree was described.

$$U(a) = alpha(level(a)+1)/height+beta.$$

The concept tree 220 depicted in FIG. 3b has height 4. However, the height of the subtree which includes Root 300, Free Time 305 and all nodes which have Free Time as ancestor, is equal to 3.

This causes that the focus determining algorithm to behave differently for the nodes Commercial 305 and Free Time 305. To make the focus determining algorithm perform uniformly, it is possible to not use a normalization function U(n) taking into account that the leaf nodes of the tree 220 have different distances to the root node 300: For Example:

$$U(a) = alpha\ (level(a) + 1) / AverageHeight(a) + beta,$$

where
AverageHeight(a) = 1 + Average level(b)
for all b which are leafs and have a as ancestor.

Optimizing Computation of Specialization Force

Assigning weights to the concept tree 220 by starting at the referent nodes and propagating the weight up towards the root 300 as already discussed is the ideal embodiment of this algorithm in most cases. However, in the case of thousands or millions of nodes 305, 310 referenced from a text, it could be computationally less expensive to compute the weights of each node using a depth-first search (DFS) instead. In a concept tree 220 with millions of nodes, a DFS will visit each node 305, 310 in the concept tree 220 a finite number of times, whereas the weight propagation method may visit the same nodes continuously. This, however, is only applicable in specialized cases with large documents.

Use of Additional Empirics

As the weights of nodes 305, 310 in a subtree are propagated upwards through the concept tree 220, it may be useful to introduce a further metric when assigning the focus node in the concept tree 220. If the current node that the focus comes to rest on has no weight of its own—i.e. all of its weight is derived from the nodes beneath it—algorithm specifies that the focus should continue on down the tree until it comes to a node which was explicitly mentioned in the input document.

Use of Semantic Information Associated with Nodes

Nodes in graphs correspond to entities, or concepts. For example, in a geographic resource, there will comprise a node for each geographical location. Additional information might be attached to each of these nodes such as population for geographical locations. This information might be converted to real-valued functions on nodes, and be factored into the computation of a node's weight.

For example, P(n)=log (population of the geographical location corresponding to the node n) These new functions computed based on semantic information associated with entities might be used in conjunction with function W and U. As an example, the following lines in the algorithm's pseudo-code:

```
Select a child with the largest value W(a)
a* = argmax { W(a): a is a child of the node f }
``` might be modified to:

```
Select a child with the biggest value W(a)* P(a)
a* = argmax { W(a)*P(a): a is a child of the node f }
```

Parameterized Level of Specification/Generalization

The notion of the central concept in a document 200 is quite intuitive and can not be easily formalized. It is clear that the desirable result depends on applications. Some application would require that the central concept(s) be more specific, some others will require better generalization. One advantage of our algorithm is that it can be adjusted to suit a particular purpose. This is achieved by modifying the functions W and U, which govern the operation of the algorithm. Thus, applications can tune the algorithm to skew the results to more generalized or specialized as they require.

Suppose that four employees in an organization are mentioned in one document. For some applications, it might be most useful for the focus of this document to be resolved as the person managing these four employees. Another application may require that a manager even further up the chain is picked as the focus.

Culturally, this parameterization is also a benefit. If one were to ask users from Ireland to decide on the focus of a document 200, they might decide it should be 'Cork'. However, users from another country may instead decide that the focus is simply "Ireland", not requiring any further specificity.

Applications to Hierarchical Classification

For the problem of hierarchical classification the following approach is suggested:

First use flat categorization and then apply the focus determining algorithm 210 to take into account the hierarchical structure of the concept tree 220.

Advantages of using such a combined approach compared to "complex" text categorization are that text categorization is a run-time expensive procedure compared to graph algorithms working on small graphs. The focus-determining algorithm 210 approach allows the utilization of less expensive flat text categorization, but obtained results which take into account the hierarchical structure of the concept tree.

The disclosed system can take the form of an entirely software embodiment, an entirely hardware embodiment, or an embodiment containing both software and hardware elements. The figures include block diagram and flowchart illustrations of methods, apparatus(es) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of".

We claim:

1. A method embodied in at least one computer system for identifying the focus of a document, in a natural language processing application, the natural language processing application comprising a hierarchical concept tree having a plurality of nodes, each node being associated with a term, the method comprising the steps of:

mapping, by the at least one computer system, an input document to nodes in a concept tree to determine a number of occurrences of a term in the input document which also occur at a node in the concept tree;

weighting each node in the concept tree, by the at least one computer system, depending on the determined number of occurrences of the term in the input document and a determined value assigned to each node in the concept tree, wherein the determined value assigned to each node in the concept tree comprises a probability that, for a given one of the occurrences of the term in the input document, the node is a correct one of a plurality of nodes within the concept tree that are associated with the term, wherein the probability is based on a total number of the plurality of nodes within the concept tree that are associated with the term, and wherein the weighting of each node in the concept tree comprises multiplying the assigned determined value and the determined number of occurrences of the associated term in the input document;

traversing the concept tree, by the at least one computer system, to identify a heaviest weighted path, in dependence on the weighting of each node in the concept tree; and determining the focus of the input document, by the at least one computer system, by identifying a node having the heaviest weight along the most heavily-weighted path.

2. The method as claimed in claim 1 wherein the determining step further comprises determining if the determined focus is too specific for the input document and on a positive determination identifying a specific focus of the input document by identifying a node having a value which is less than the sum of the node's child nodes.

3. The method as claimed in claim 1 wherein the step of weighting further comprises incrementing a weight count at each node, each time a term in the input document is mapped to a node in the concept tree.

4. The method as claimed in claim 1 wherein the step of weighting further comprises identifying an ambiguous term in the input document, by mapping the term in the input document to a plurality of nodes in the concept tree.

5. The method as claimed in claim 1 wherein, the step of traversing the concept tree further comprising performing a depth first search to identify the node along a weighted path having the heaviest weight.

6. The method as claimed in claim 1 wherein on traversing the concept tree to identify the focus, and computing more than one focus, the traversing step further comprising the step of, determining whether the determined weights of each of the focus nodes differ by a threshold value and, on a positive determination, traversing each of the foci node's paths until another focus node is identified.

7. The method as claimed in claim 1 wherein if the traversing step traverses the concept tree and identifies the focus being a node having only a weight of the sum of its child node, the traversing step continues to traverse the remainder of the node's path to find an alternative focus.

8. An apparatus comprising:
at least one processor and a computer readable storage medium having program code stored thereon for identifying the focus of a document, in a natural language processing application, the natural language processing application comprising a hierarchical concept tree having a plurality of nodes, each node being associated with a term, by executing the following steps:
mapping an input document to nodes in a concept tree to determine a number of occurrences of a term in the input document which also occur at each of the nodes in the concept tree,
weighting each node in the concept tree, depending on the determined number of occurrences of the term in the input document and a determined value assigned to each node in the concept tree, wherein the determined value assigned to each node in the concept tree comprises a probability that, for a given one of the occurrences of the term in the input document, the node is a correct one of a plurality of nodes within the concept tree that are associated with the term, wherein the probability is based on a total number of the plurality of nodes within the concept tree that are associated with the term, and wherein the weighting of each node in the concept tree comprises multiplying the assigned determined value and the determined number of occurrences of the associated term in the input document,
traversing the concept tree to identify a heaviest weighted path, in dependence of the weighting of each node in the concept tree, and
determining the focus of the input document by identifying a node having the heaviest weight along the most heavily weighted path.

9. The apparatus as claimed in claim 8, the steps further comprising determining if the determined focus is too specific for the input document and on a positive determination identifying a specific focus of the input document by identifying a node having a value which is less than the sum of the node's child nodes.

10. The apparatus as claimed in claim 8, the steps further comprising incrementing a weight count at each node, each time a term in the input document is mapped to a node in the concept tree.

11. The apparatus as claimed in claim 8, the steps further comprising identifying an ambiguous term in the input document, by mapping the term in the input document to a plurality of nodes in the concept tree.

12. The apparatus as claimed in claim 8, the steps further comprising performing a depth first search to identify the node along a weighted path having the heaviest weight when traversing the concept tree.

13. The apparatus as claimed in claim 8, the steps further comprising on traversing the concept tree to identify the focus, and on determining more than one focus, determining whether the determined weights of each of the focus nodes differ by a threshold value and, on a positive determination, traversing each of the focus node's paths until another focus node is identified.

14. The apparatus as claimed in claim 8, the steps further comprising when traversal of the concept tree identifies the focus as a node which only has a weight of the sum of its child node, continuing to traverse the remainder of the node's path to find an alternative focus.

15. A computer program product, wherein said computer program product includes a computer readable storage medium, said computer readable storage medium having computer program code recorded thereon for identifying the focus of a document, in a natural language processing application, the natural language processing application comprising a hierarchical concept tree having a plurality of nodes, each node being associated with a term, wherein said program code, when executed, would cause a computer system to:
map an input document to nodes in a concept tree to determine a number of occurrences of a term in the input document which also occur at a node in the concept tree;
weight each node in the concept tree, depending on the determined number of occurrences of the term in the input document and a determined value assigned to each node in the concept tree, wherein the determined value assigned to each node in the concept tree comprises a probability that, for a given one of the occurrences of the term in the input document, the node is a correct one of a plurality of nodes within the concept tree that are associated with the term, wherein the probability is based on a total number of the plurality of nodes within the concept tree that are associated with the term, and wherein the weighting of each node in the concept tree comprises multiplying the assigned determined value and the determined number of occurrences of the associated term in the input document;
traverse the concept tree to identify a heaviest weighted path, in dependence on the weighting of each node in the concept tree; and
determine the focus of the input document by identifying a node having the heaviest weight along the most heavily-weighted path.

* * * * *